United States Patent [19]

Bazan, John A.

[11] 4,185,942
[45] Jan. 29, 1980

[54] MATERIAL TRANSFER SYSTEM

[75] Inventor: Bazan, John A., Nutley, N.J.

[73] Assignee: The United States of America as represented by the Administrator of the United States Environmental Protection Agency, Washington, D.C.

[21] Appl. No.: 840,183

[22] Filed: Oct. 6, 1977

[51] Int. Cl.² .............................................. B65G 53/42
[52] U.S. Cl. ..................................... 406/85; 406/108; 406/194
[58] Field of Search ................... 302/17, 19, 25, 26, 302/29, 48, 51, 53, 57, 64

[56] References Cited

U.S. PATENT DOCUMENTS

| 477,692 | 6/1892 | McConnell | 302/57 |
|---|---|---|---|
| 1,308,464 | 7/1919 | Westly | 302/26 |
| 2,527,455 | 10/1950 | Schemm | 302/29 |
| 2,684,869 | 7/1954 | Lapple | 302/17 |
| 2,723,883 | 11/1955 | Lapple | 302/17 |
| 2,802,698 | 8/1957 | Krauss | 302/29 |
| 3,316,024 | 4/1967 | Nakano | 302/26 |
| 3,380,780 | 4/1968 | Allen et al. | 302/26 |
| 3,442,556 | 5/1969 | Von Funk | 302/28 |
| 4,009,912 | 3/1977 | Mraz | 302/57 |
| 4,041,141 | 8/1977 | Moss | 423/571 |
| 4,067,623 | 1/1978 | Klein et al. | 302/26 |

Primary Examiner—Jeffrey V. Nase
Attorney, Agent, or Firm—Marvin A. Naigur; John E. Wilson; John J. Herguth, Jr.

[57] ABSTRACT

A material transfer system for transferring particulate material from a first fluidized bed to a second fluidized bed includes a rectangular, vertically-aligned downcomer communicating at its lower end with a rectangular, horizontally-aligned exhaust duct. A sparger assembly having plural gas injection tubes communicates with the exhaust duct and is provided to direct horizontally spaced gas flows into the exhaust duct. A control valve coupled to the sparger assembly selectively starts and stops the flow of an activating gas to define gas flow pulses having a selected pulse duration. Particulate material from the first fluidized bed enters the downcomer through a catch pocket formed at the upper end of the downcomer and fills both the downcomer and the exhaust duct. The gas flow pulses entrain the particulate material in the exhaust duct and transport it through an outlet into the second fluidized bed.

8 Claims, 5 Drawing Figures

MATERIAL TRANSFER SYSTEM

BACKGROUND OF THE INVENTION

The present invention relates to an apparatus for transporting particulate material and, more particularly, to material transfer systems for transferring particulate material from a first fluidized bed to a second fluidized bed.

Material transfer systems adapted to transfer particulate material typically include a hollow duct and means to cause a high velocity flow of gas, known as activating gas, in the duct. Particulate material is introduced into the duct at an entry point, entrained in the activating gas, and thereby transported along the duct to a discharge point. In general, this type of structure can efficiently and conveniently transport large quantities of particulate material.

Special problems arise when conventional material transfer systems are utilized to transfer particulate material between fluidized beds. As is well known, fluidized beds employ a vertical rising stream of gas moving upwardly at a velocity sufficient to overcome the force of gravity to suspend or fluidize small particles. The overall size of the fluidized bed is controlled, in part, by accurately controlling the amount of fluidized particulate material. Conventional material transfer systems which utilize high pressure activating gas can cause disturbances in the fluidizing gas stream which adversely effect the operation of the fluidized bed. Likewise, conventional material transfer systems generally cannot transport particulate material in accurately controlled amounts to permit convenient control of the size of the fluidized bed.

SUMMARY OF THE INVENTION

It is an object of the present invention to provide a transfer system for efficiently transferring particulate material from a first fluidized bed to a second fluidized bed.

It is another object of the present invention to provide an apparatus for transferring particulate material from a first fluidized bed to a second fluidized bed while minimizing disturbances to the equilibrium of the fluidized beds.

It is a further object of the present invention to provide an apparatus for transferring particulate material from a first fluidized bed to a second fluidized bed which operates from a source of low pressure gas.

It is still another object of the present invention to provide an apparatus for transferring particulate material from a first fluidized bed to a second fluidized bed in which the particulate material transfer rate can be accurately controlled.

Toward the fulfillment of these and other objects, the present invention provides a material transfer system for transferring particulate material between a first material container and a second material container which includes a rectangular downcomer duct communicating at its lower end with an end of a rectangular exhaust duct. Plural gas injection means in communication with the end of the exhaust duct are adapted to direct spaced gas flows into the exhaust duct toward an outlet end of the material transfer conduit. Control means are provided to start and stop the gas flows to define gas flow pulses having a preferred pulse duration.

Particulate material enters the material transfer conduit from a first material container through an inlet at the upper end of the downcomer and fills the downcomer and the exhaust duct. Each gas flow pulse entrains a uniform quantity of the particulate material in the exhaust duct and transports it through the outlet end of the exhaust duct into the second container. The material transfer rate can be accurately controlled by varying the gas flow pulse repetition rate.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in conjunction with the accompanying drawings wherein.

DESCRIPTION OF THE PREFERRED EMBODIMENT

Figure 1:
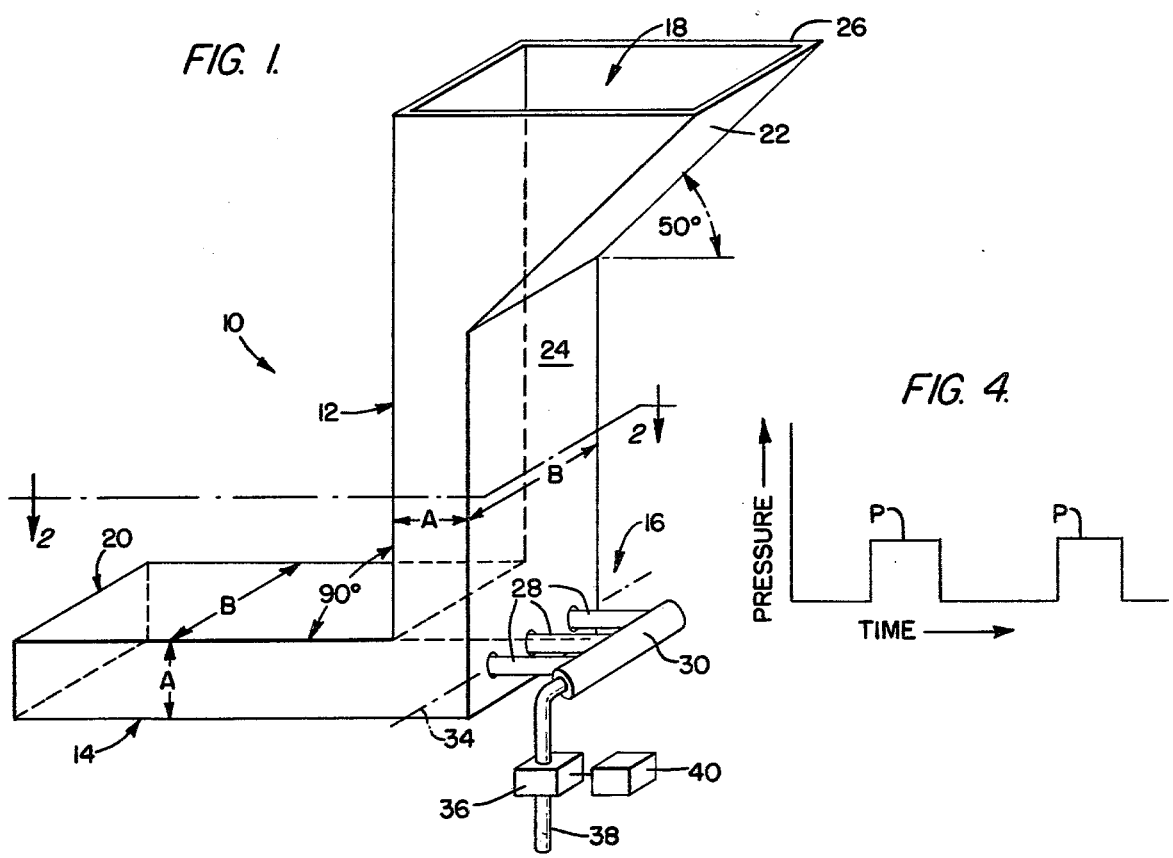
FIG. 1 is a perspective view of a material transfer system of the present invention.

As shown in FIG. 1, the reference character 10 refers in general to a material transfer system of the present invention which includes a vertically-aligned duct, designated herein as a downcomer 12, communicating at its lower end with an end of a horizontally-aligned exhaust duct 14, and a sparger assembly, generally designated herein by the reference character 16, communicating with the end of the exhaust duct 14. The material transfer system 10, which is preferably molded or cast as a unitary structure from a refractory material, is adapted to accept particulate material (not shown) through an inlet end 18 of the downcomer 12 and transport the particulate material through an outlet end 20 of the exhaust duct 14 in the manner described below.

The downcomer 12 has a rectangular cross-section with an upper portion 22 of a downcomer panel 24 bent or formed outwardly of the downcomer 12 to provide an expanded inlet funnel or catch pocket 26. In the preferred embodiment, the upper portion 22 of the downcomer panel 24 is formed outwardly at an angle of 50° with respect to the horizontal. The exhaust duct 14, which also has a rectangular cross section, communicates with the lower end of the downcomer 12, with the downcomer 12 and the exhaust duct 14 preferably meeting at an angle of 90°. Both the downcomer 12 and the exhaust duct 14, when viewed in cross-section have a altitude dimension "A", and a base dimension "B". In the preferred embodiment, the ratio of dimension "A" to dimension "B" is less than one and preferably equal to approximately 0.58. It has been empirically determined that the rectangular duct cross section and, more particularly, the rectangular duct cross-section having the aforementioned ratio provides a significantly higher material transport ratio, and, thus, higher efficiency than ducts which utilize a non-rectangular cross section or a rectangular cross section having ratio(s) substantially different from the aforementioned ratio.

Figure 2:
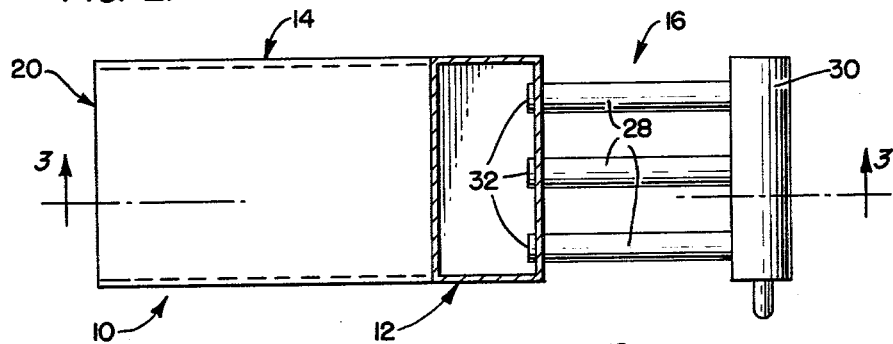
FIG. 2 is a partial cross-section view of the material transfer system shown in FIG. 1 taken along line 2—2 of FIG. 1.
Figure 3:
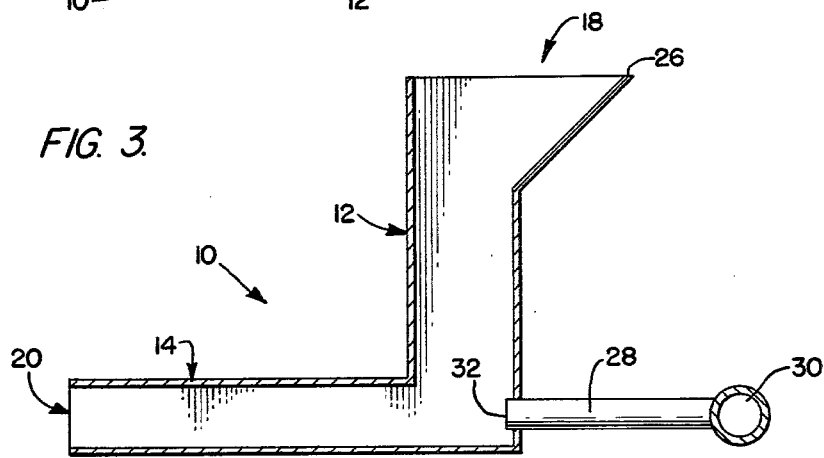
FIG. 3 is a side elevation cross-section view of the material transfer system shown in FIG. 1.

As shown in FIGS. 1-3, the sparger assembly 16 includes three hollow feed tubes 28 communicating with a gas manifold 30. An outlet end 32 of each feed tube 28 extends through the lower end of the downcomer panel 24 into the exhaust duct 14. The other end of each feed tube 28 communicates with the gas manifold 30, which is adapted to distribute pressurized gas, designated herein as activating gas, to each of the feed tubes 28. In the preferred embodiment, the outlet end 32 of each of the feed tubes 28 is located in a spaced-apart relation along a horizontally disposed line 34, preferably the medial line of the exhaust duct 14.

Figure 4:
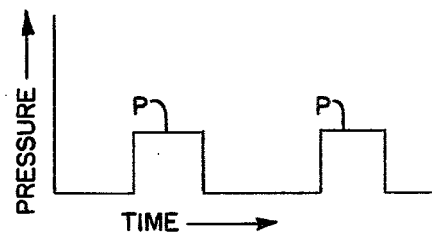
FIG. 4 is an idealized graphical representation of gas pressure (ordinate) with respect to time (abscissa)

As shown in FIG. 1, a valve means 36, preferably in the form of an electrically controlled ON-OFF type valve, is provided in an activating gas supply pipe 38. The valve means 36 is adapted to selectively start and stop the flow of activating gas from a source (not shown) through the supply pipe 38 to the gas manifold 30. In the preferred embodiment, flue gas at a pressure of approximately 2.5 psig is utilized as the activating gas. A control means 40 is coupled to the valve means 36 to provide suitable ON-OFF electrical commands to the valve means 36. The electrical commands takes the form of pulses having a selected pulse duration and pulse repetition rate. The valve means 36 responds to these electrical pulses to start and stop the gas flow and thereby define gas pressure pulses P having a selected pulse duration as shown in FIG. 4.

In an exemplary application, material transfer conduits of the present invention are employed in a process to produce the low BTU fuel gas in which limestone particles are circulated between a gasification fluidized bed and a regeneration fluidized bed. In the gasification fluidized bed, a mixture of heated coal and limestone particles is fluidized to produce the fuel gas. The limestone particles are provided to adsorb pollutants, namely, the oxides of sulfur, formed during the gasification step period. In order to regenerate the limestone particles for reuse, they are transferred to the regenerator fluidized bed through a material transfer system of the present invention. The limestone particles, which have a preferred particle size of 3 mm or less, are caused to leave the gasification fluidized bed and descend into both the downcomer 12 and the exhaust duct 14 where they accumulate in a loosely packed state, filling both the downcomer 12 and the exhaust duct 14. When it is desired to transfer the particles from the gasifier fluidized bed to the regenerator fluidized bed, the control means 40 is actuated to turn the valve means 36 ON and then OFF to create a gas pressure pulse P of selected duration. In the exemplary application, an activating gas pulse duration of 1.5 seconds has been found to be optimum for transferring a substantial portion of the material in the exhaust conduit 14. The activating gas enters the gas manifold 30 and is distributed to each of the feed tubes 28. The activating gas exits the outlet end 32 of each feed tube 38 to thereby generate spaced, horizontally-directed gas flows which are directed toward the outlet end 20 of the exhaust duct 14. The particles accumulated in the exhaust duct 14 are entrained by the gas flows and transported out of the outlet end 20 of the exhaust duct 14 into the regeneration fluidized bed. The activating gas at the outlet end 32 of each feed tube 28 also serves to partially aerate the loosely packed material residing in the downcomer 12 to prevent the material in the downcomer 12 from filling the exhaust duct 14 while the material entrained by the activating gas is transported out of the exhaust duct 14 into the regeneration fluidized bed. At the end of the activating gas pulse, the loosely packed particles in the downcomer 12 flow downward filling the exhaust duct 14. The control means may be actuated again to initiate another pulse P of activating gas to continue the particle transfer sequence.

By using the activating gas in pulse form rather than in continuous form, the particles are transferred in accurately controlled amounts using only the minimum amount of gas necessary to accomplish the transfer. The pulse duration is selected so that it is long enough to transfer a substantial amount of the accumulated particles in the exhaust duct 14, yet short enough that little of the activating gas disturbs the fluidized bed at the outlet 20 of the exhaust duct 14 or flows upwardly into the downcomer 12 to the gasifier fluidized bed. The overall material transfer rate can be accurately controlled by varying the pulse repetition rate. The length of time between successive pulses, however, must be sufficiently long to permit the exhaust duct 14 to refill with particles from the downcomer 12.

Figure 5:
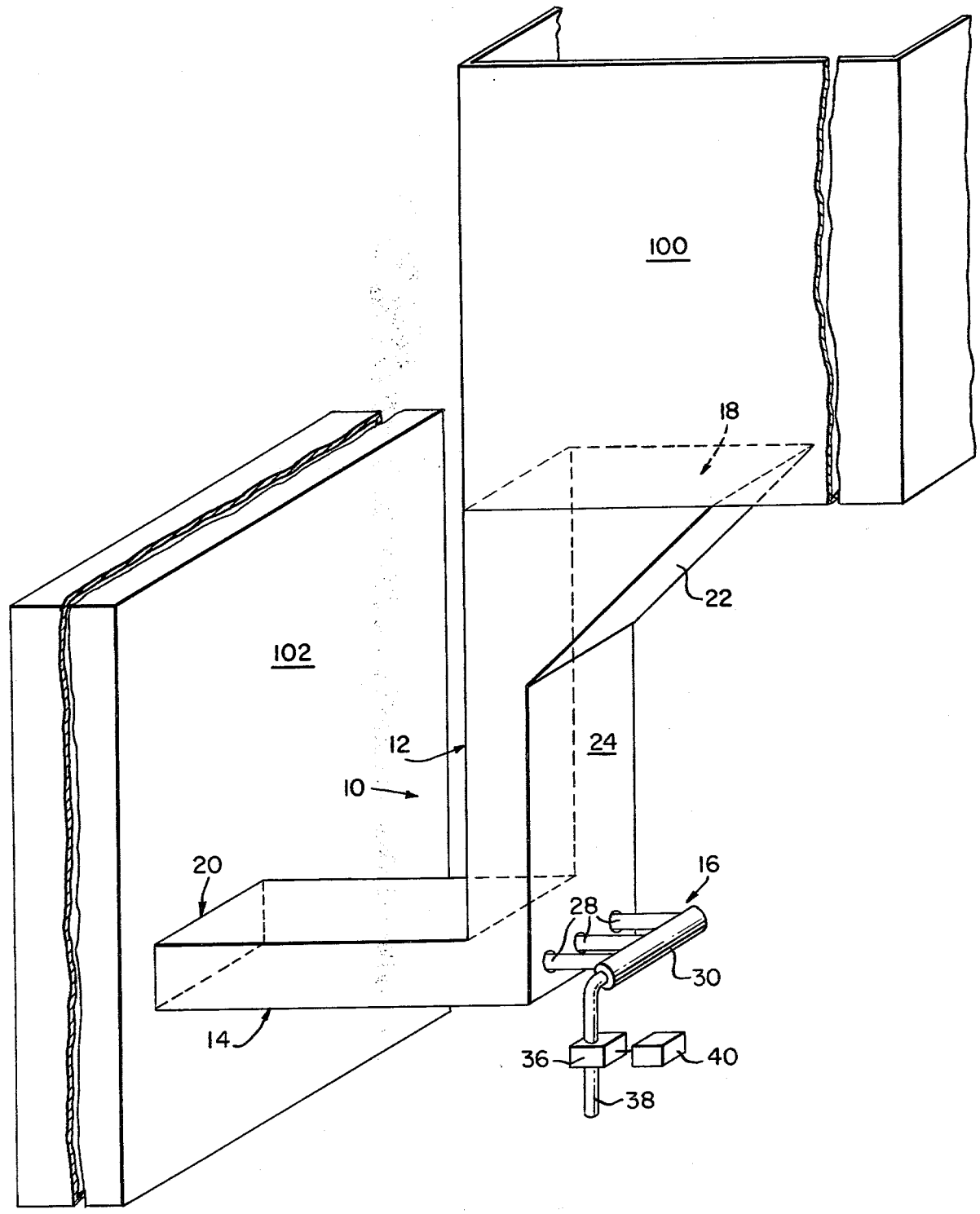
FIG. 5 is a perspective view of a material transfer system of FIG. 1 connected to a first particulate material container and a second particulate material container for transferring material therebetween in which the material containers are shown in fragmented, perspective form.

As shown in FIG. 5, the apparatus of the present invention provides a material transfer system for efficiently transferring particulate material from a first fluidized bed container 100 to a second fluidized bed container 102 using a source of low pressure gas, in which the disturbances to the fluidized beds are minimized and in which the particle transfer rate can be accurately controlled.

As is apparent to those skilled in the art, various changes and modifications may be made to the material transfer conduit of the present invention without departing from the spirit and scope of the present invention as recited in the appended claims and their legal equivalent.

What is claimed is:

1. A material transfer system for transferring particulate material between a first material container and a second material container comprising:
    a downcomer duct having an upper end thereof adapted to communicate with a first material container for receiving and storing particulate material;
    an exhaust duct aligned along the horizontal and having a rectangular cross-section with one end communicating with said downcomer duct for receiving the material and an outlet end for discharging the material into a second material container, said rectangular cross-section having an altitude dimension and a base dimension with the ratio of said altitude dimension to said base dimension being approximately equal to 0.58; and
    a plurality of gas flow tubes each having an open end thereof communicating with the interior of said exhaust duct opposite from the discharge end, each of said tubes adapted to direct pulsed gas flows at a selected pulse repetition rate towards the discharge end of said exhaust duct, each pulse thereby entraining the material in said exhaust duct and transporting the material in the direction of the gas flow through said outlet end into the second material container, said tubes arranged in a spaced apart relationship along a horizontal line, said line being the medial line of said exhaust duct cross-section.

2. The material transfer system claimed in claim 1, wherein said downcomer duct is aligned along a substantially vertical axis.

3. The material transfer system claimed in claim 1, wherein said downcomer duct is formed with said rectangular cross-section.

4. The material transfer system claimed in claim 1, further comprising:
a catch pocket formed at said inlet end of said downcomer to receive said particulate material.

5. The material transfer system claimed in claim 1, wherein:
the other ends of said feed tubes communicate with a gas distribution manifold.

6. The material transfer system claimed in claim 5, further comprising:
valve means to selectively start and stop the gas flow from said gas flow tubes to define successive gas pressure pulses.

7. The material transfer system claimed in claim 6, wherein:
said gas pressure pulses have a pulse duration of approximately 1.5 seconds.

8. The material transfer system claimed in claim 6, further comprising:
control means operably connected to said valve means to vary the pulse repetition rate of said gas pressure pulse.

* * * * *